United States Patent
Harr

(10) Patent No.: US 9,651,167 B2
(45) Date of Patent: May 16, 2017

(54) TRENCHLESS DRAINAGE STRUCTURE REPLACEMENT

(71) Applicant: Harr Technologies, Inc., Anchorage, AK (US)

(72) Inventor: Robert E. Harr, Kasilof, AK (US)

(73) Assignee: Harr Technologies, Inc., Anchorage, AK (US)

( * ) Notice: Subject to any disclaimer, the term of this patent is extended or adjusted under 35 U.S.C. 154(b) by 0 days.

(21) Appl. No.: 14/605,712

(22) Filed: Jan. 26, 2015

(65) Prior Publication Data

US 2015/0369394 A1 Dec. 24, 2015

Related U.S. Application Data

(63) Continuation of application No. 14/054,666, filed on Oct. 15, 2013, now abandoned, which is a continuation of application No. 13/269,435, filed on Oct. 7, 2011, now Pat. No. 8,556,539.

(60) Provisional application No. 61/391,494, filed on Oct. 8, 2010.

(51) Int. Cl.

| F16L 1/036 | (2006.01) |
|---|---|
| F16L 55/18 | (2006.01) |
| E21B 7/20 | (2006.01) |
| E21B 7/30 | (2006.01) |
| E21B 17/03 | (2006.01) |
| F16L 55/168 | (2006.01) |
| F16L 1/028 | (2006.01) |
| F16L 9/22 | (2006.01) |

(52) U.S. Cl.
CPC ............. *F16L 1/036* (2013.01); *E21B 7/205* (2013.01); *E21B 7/30* (2013.01); *E21B 17/03* (2013.01); *F16L 1/028* (2013.01); *F16L 9/22* (2013.01); *F16L 55/168* (2013.01); *F16L 55/18* (2013.01)

(58) Field of Classification Search
CPC .................................. F16L 1/028; F16L 1/036
See application file for complete search history.

(56) References Cited

U.S. PATENT DOCUMENTS

| 2,325,565 A * | 7/1943 | Williams ................ E21B 7/046 |
|---|---|---|
| | | 175/217 |
| 4,124,082 A * | 11/1978 | Garver .................... E21B 7/003 |
| | | 175/161 |
| 4,329,077 A * | 5/1982 | Bouplon ................... E02D 7/20 |
| | | 403/287 |

(Continued)

FOREIGN PATENT DOCUMENTS

| EP | 0444217 A1 | 9/1991 |
|---|---|---|
| JP | 1102134 | 4/1989 |
| KR | 10-0610368 B1 | 8/2006 |

OTHER PUBLICATIONS

International Search Report & Written Opinion dated May 29, 2012, for PCT Appl. No. PCT/US2011/055449.

*Primary Examiner* — Frederick L Lagman
(74) *Attorney, Agent, or Firm* — Dorsey & Whitney LLP

(57) ABSTRACT

Replacement drainage structures and methods for replacing drainage structures are disclosed. An example method includes driving a plurality of sections of a replacement drainage structure around a buried drainage structure to be replaced. At least a portion of the drainage structure to be replaced is positioned within the interior of a section of the replacement drainage structure. Portions of the drainage structure to be replaced are removed.

7 Claims, 7 Drawing Sheets

(56) References Cited

U.S. PATENT DOCUMENTS

| | | | | |
|---|---|---|---|---|
| 4,796,669 A * | 1/1989 | St. Onge | ................. | F16L 1/036 |
| | | | | 138/155 |
| 4,886,396 A * | 12/1989 | Akesaka | ................. | E21B 7/208 |
| | | | | 299/67 |
| 7,993,078 B2 * | 8/2011 | Crane | ....................... | E02F 1/00 |
| | | | | 405/184.1 |
| 8,556,539 B2 * | 10/2013 | Harr | ....................... | E21B 7/205 |
| | | | | 405/184 |
| 2008/0193220 A1 * | 8/2008 | Crane | ....................... | E02F 1/00 |
| | | | | 405/184 |
| 2012/0087739 A1 * | 4/2012 | Harr | ....................... | E21B 7/205 |
| | | | | 405/184.1 |
| 2014/0112721 A1 | 4/2014 | Harr | | |

\* cited by examiner

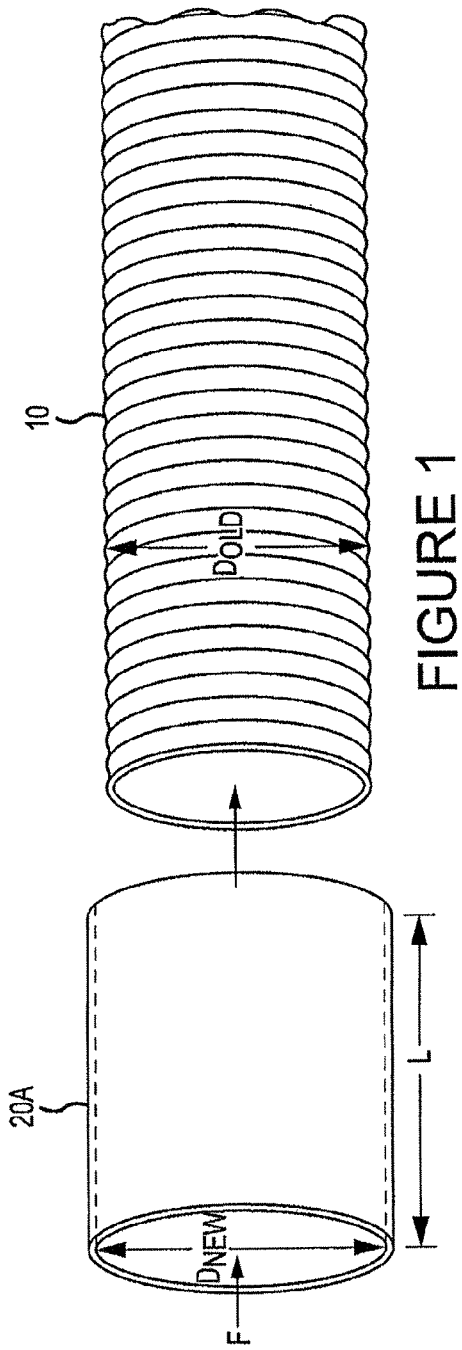
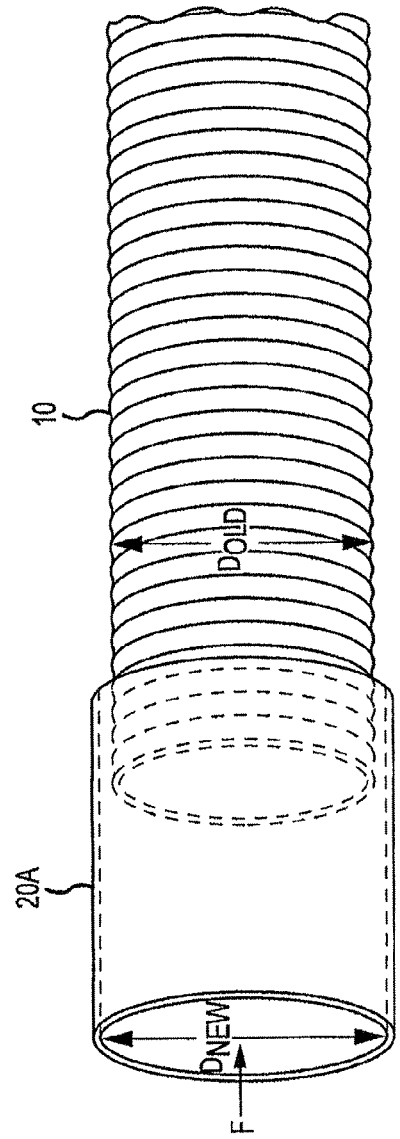

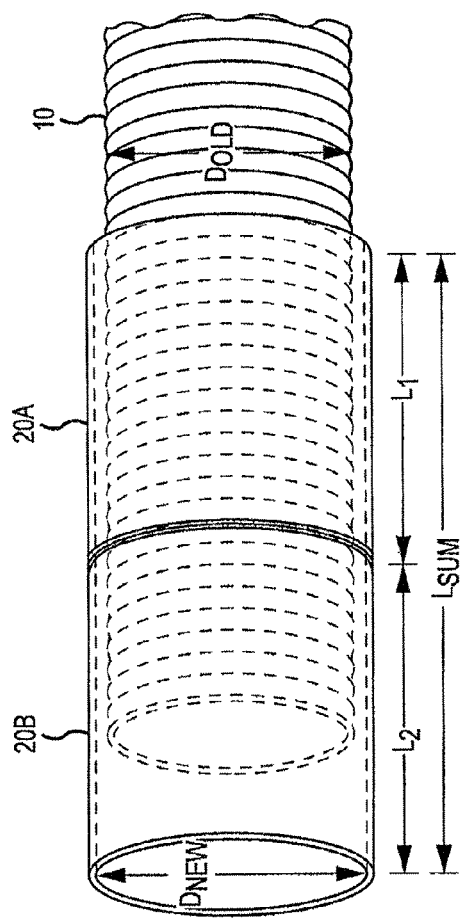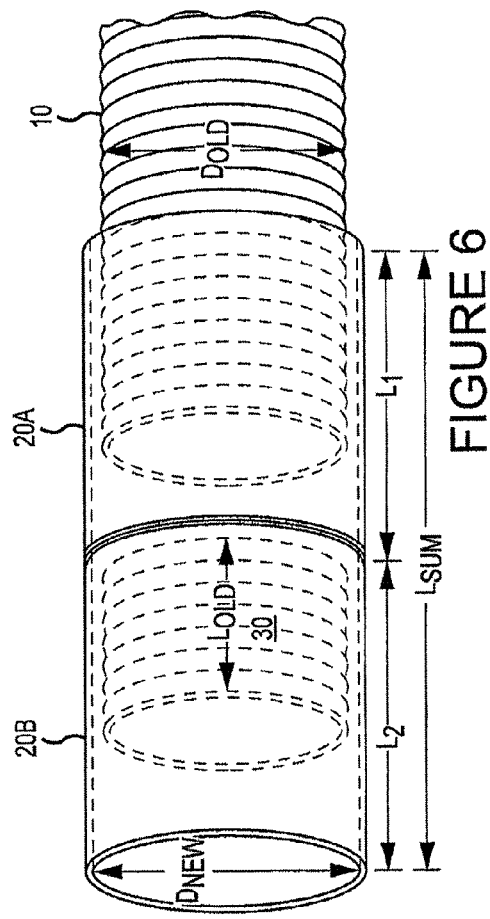

TRENCHLESS DRAINAGE STRUCTURE REPLACEMENT

CROSS REFERENCE TO RELATED APPLICATION

This application is a continuation of U.S. patent application Ser. No. 14/054,666 filed on Oct. 15, 2013, now abandoned, which is a continuation of U.S. patent application Ser. No. 13/269,435, filed on Oct. 7, 2011, and issued as U.S. Pat. No. 8,556,539 on Oct. 15, 2013, which claims priority to Provisional Application No. 61/391,494, filed Oct. 8, 2010. These applications and patent are incorporated herein by reference, in their entirety, for any purpose.

TECHNICAL FIELD

Embodiments of the invention relate generally to culvert replacement, and more specifically in one or more of the described embodiments, to trenchless drainage structure replacement.

BACKGROUND OF THE INVENTION

Throughout the United States and other countries culverts are failing every day. Culverts provide important drainage functions for roads, railroad beds, and drainage systems. The life of many corrugated metal pipe (CMP) culverts have passed. Just in New Mexico alone over 430 thousand are in critical condition. Culvert failures are imminent and occurring every day. Loss of life, property damage and user delay cost are critical to the public. Using traditional trenched methods the roadway may have to be closed, or in cases where it is feasible to do half width construction, safety concerns come into play, and must be addressed with traffic control solutions which can be problematic in situations of high traffic density as well as locations having limited access through the area of control. Moreover, with increasing environmental regulations trenched methods produce another set of issues because of the amount of material that must be disturbed to replace a culvert Culvert locations by nature are often near bodies of water.

BRIEF DESCRIPTION OF THE DRAWINGS

FIGS. 1-6 are diagrams for a trenchless culvert replacement process according to an embodiment of the invention.

DETAILED DESCRIPTION OF PREFERRED EMBODIMENTS

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments.

FIGS. 1 through 6 illustrate a trenchless drainage structure replacement process according to an embodiment of the invention. An example of a drainage structure includes a culvert, for example, culvert 10 shown in FIGS. 1 through 6. Other types of drainage structures or portions of drainage structures (e.g., sewers, storm drains, and the like) having different materials, shapes and designs may be replaced using embodiments of the invention as well. Drainage structures are typically buried and surrounded by earth, and positioned near a road or other structure for vehicles to provide drainage.

The culvert 10 having an outside cross-sectional dimension (e.g., diameter) of Dold is replaced by driving sections of replacement pipe 20 having a length L and an interior cross-sectional dimension (e.g., diameter) Dnew that is greater than Dold to swallow the culvert 10 (FIG. 1). The culvert 10 may be a corrugated metal pipe (CMP), or may be made from other materials or have other designs. The length L of the sections of replacement pipe 20 may depend at least in part, for example, on the working environment, the material in which the culvert 10 is buried, and the ability to handle and maneuver the sections. The replacement pipe 20 may be a smooth wall A252 grade 3 metal pipe. In some embodiments, the replacement pipe 20 may have designs or may be made from materials other than that shown and specifically identified in the present application. In some embodiments, the chemical composition or the type of metal/alloy of the material from which a metal replacement pipe is formed may be changed based on the chemical composition of the material in which the culvert 10 is buried.

Figure 3:
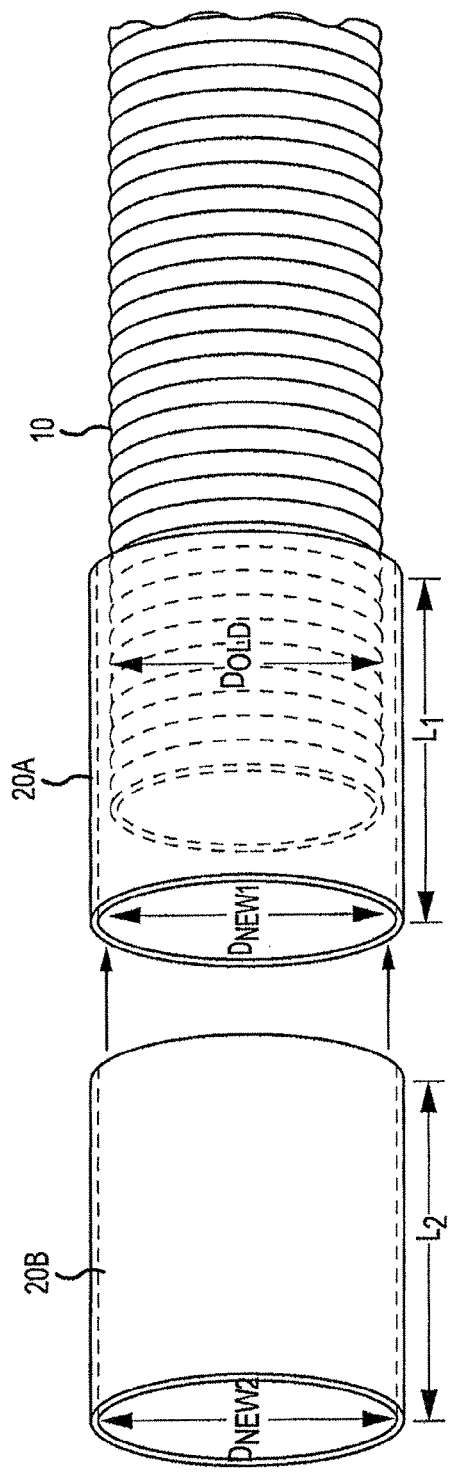
Figure 4:
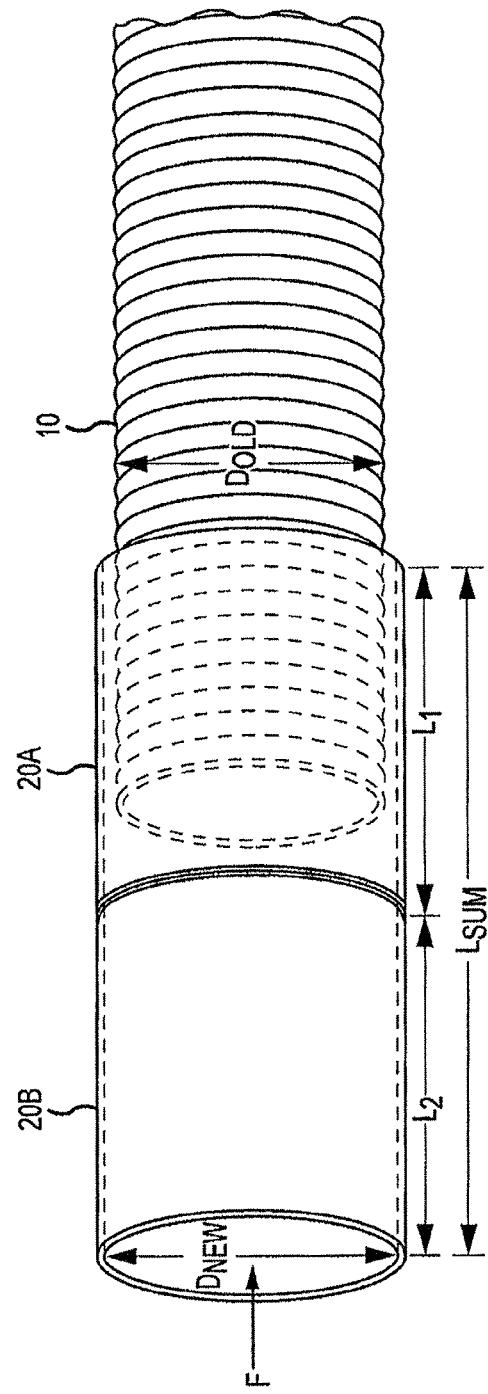

A line and grade of the culvert 10 is obtained, for example, by survey, and a first section of replacement pipe 20A is aligned to the culvert 10 and according to the line and grade. A force F is applied to the replacement pipe 20A to drive it into the material in which the culvert 10 is located (FIG. 2) with and position at least a portion of the replacement pipe 20A around the culvert 10 thereby "swallowing" the culvert. After the section of replacement pipe 20A is driven to swallow a portion of the culvert 10, a second section of replacement pipe 20B is lined up with and positioned adjoining the first section 20A (FIG. 3). Preferably, the second section 20B is the same diameter as the first section 20A. A jig may be used to align the new sections of replacement pipe 20 to maintain the line and grade. The second section 20B is joined to the first section 20A, for example, by welding. A force F is applied to the second section 20B to drive the first and second sections 20A and 20B to further swallow the culvert 10 (FIGS. 4 and 5). A section 30 of the culvert 10 is cut and removed to reduce the overlap between the culvert 10 and the sections of replacement pipe 20 (FIG. 6). The section 30, which may be large and unwieldy, may be removed using various equipment. The section 30 may be cut into smaller parts (not shown in FIG. 6) and removed in pieces. Additional sections of replacement pipe 20 are aligned and joined to the end of the replacement pipe already driven into the material in which the culvert 10 is buried and additional sections of the culvert 10 are cut and removed to reduce overlap. The process of joining new replacement sections, driving the sections of replacement pipe 20 to further swallow the culvert 10, and removing sections of the culvert 10 is repeated until the old culvert is removed.

Example dimensions for the sections of replacement pipe 20 may include a 20 foot long (L) section having an exterior diameter of 96 inches and an interior diameter (Dnew) of 94 inches to replace a culvert having a Dold of 84 inches. The wall thickness of the replacement pipe 20 may be 1 inch. As new sections of the replacement pipe 20 are added, 20 foot sections of the culvert 10 may be cut and removed.

In some embodiments of the invention, a lubricant may be applied near the leading edge of the replacement pipe 20 to facilitate driving of the replacement pipe 20 into the material in which the culvert 10 is buried. Examples of lubricants include fluids having including bentonite, conventional drilling fluids/lubricants, biodegradable fluids/lubricants, as well as others now known or later developed. In some embodiments, an attachment (e.g., a "soil shoe," not shown) is joined to the leading edge of the first section of replacement pipe 20 to guide its direction as the replacement pipe 20 is driven into the material surround the culvert 10. The attachment can be designed with a shape (e.g., an angled lip) to urge the leading edge of the replacement pipe in a desired direction as it is being driven forward to swallow the culvert 10. For example, the attachment may be used to counteract the tendency for the replacement pipe to drift downward due to gravity.

As previously discussed, a force F is applied to the end of the replacement pipe 20 to swallow the culvert 10. The force F may be provided using various types of equipment. One example is by using a pneumatic hammer attached to the replacement pipe. An example of a pneumatic hammer that may be used is a HammerHead™ pipe rammer provided by Earth Tool Company, which can develop up to 1,010 tons of force and can strike 150 blows per minute. Other types of pneumatic hammers may be used as well.

Figure 7:
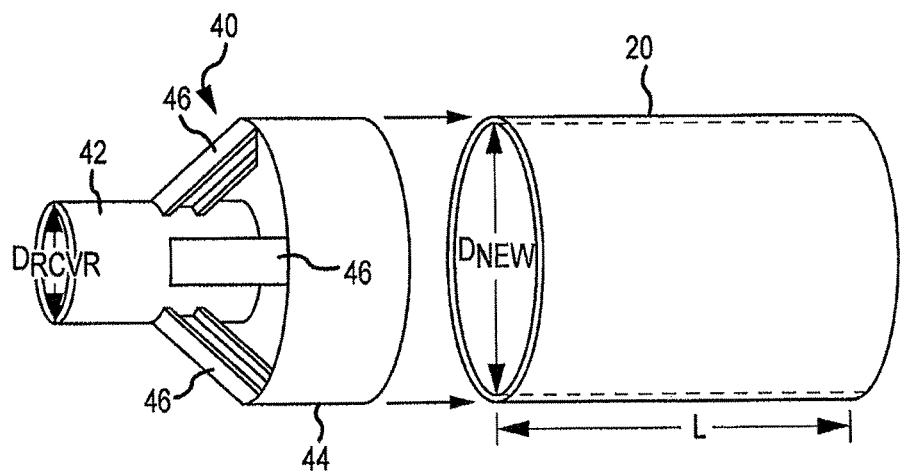
FIGS. 7 and 8 are diagrams for a collet and tool according to an embodiment of the invention for transferring driving force to a section of replacement pipe.

A pneumatic hammer may be attached to the replacement pipe using a collet. FIG. 7 illustrates a tool 40 and collet 50 arrangement according to an embodiment of the invention for attaching a pneumatic hammer to a section of replacement pipe. The tool 40 includes a receiving portion 42 having an interior diameter Drcvr into which the collet 50 fits. The receiving portion 42, which may be cylindrical in shape, is attached to a mounting portion 44 by supports 46. The mounting portion 44 is attached to an end of the section of replacement pipe 20. The mounting portion 44 may be formed from a portion of a section of replacement pipe 20 and the supports 46 may be sections of an I-beam joined to the receiving portion 42 and the mounting portion 44 by, for example, welding.

Figure 8:
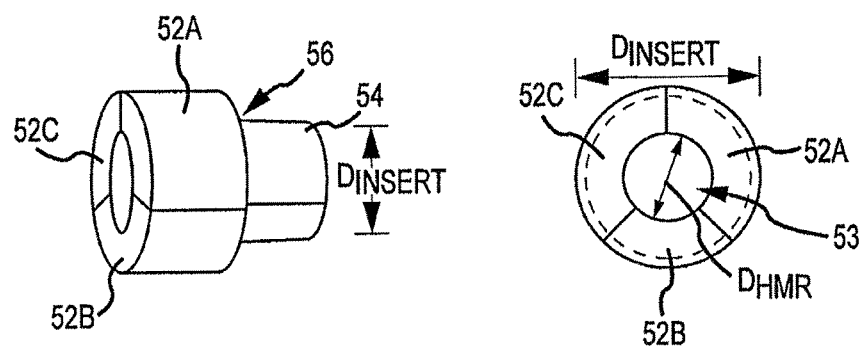

An example of a collet 50 is illustrated in FIG. 8. The collet 50 of FIG. 8 includes three portions 52A, 52B, 52C that may be positioned adjacent one another to form an annular shape. The resulting opening 53 has an interior diameter Dhmr that is configured to receive a pneumatic hammer, or other equipment to provide a force F, and hold it in place as driving force is applied. Each of the portions 52A, 52B, 52C has a portion 54 that fits within the receiving portion 42 and a shoulder 56 that abuts a front edge of the receiving portion 42. The resulting outside diameter Dinsert of the portion 54 is generally less than the interior diameter Drcvr of the receiving portion 42. The portion 54 may have a taper that facilitates insertion of the collet 50 into the receiving portion 42 while also providing greater clamping force to equipment positioned in the opening 53 as force F is applied.

Driving force from a pneumatic hammer is transferred through the collet 50 and tool 40 to the section of replacement pipe 20. The tool 40 may be fixed to the section of replacement pipe 20, for example, by welding. The tool 40 is then removed when a new section of replacement pipe 20 is added and attached to the new section.

Figure 9:
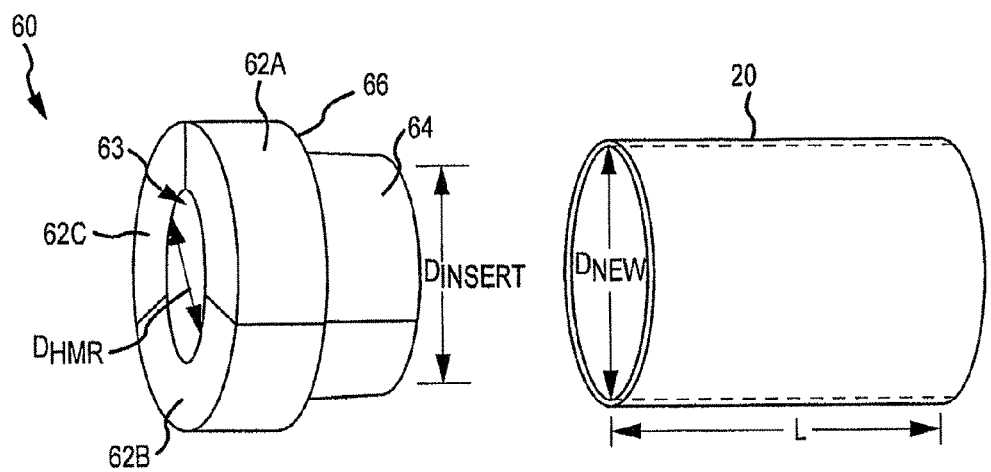
FIGS. 9 and 10 are diagrams for a collet according to an embodiment of the invention for transferring driving force to a section of replacement pipe.
Figure 10:
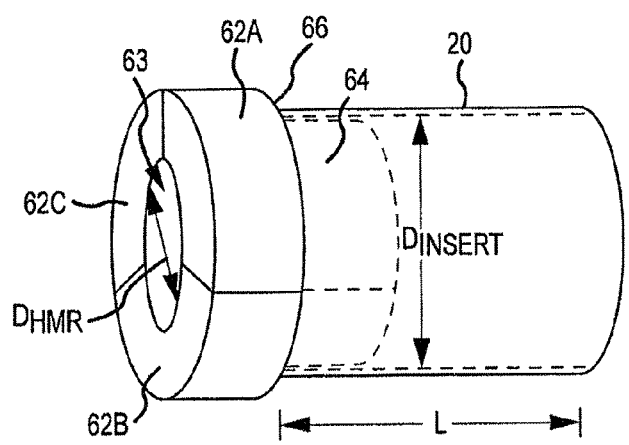

FIGS. 9 and 10 illustrate a collet 60 according to an embodiment of the invention. In contrast to the collet 50 and tool 40 arrangement illustrated in the embodiment of FIGS. 7 and 8, the collet 60 is inserted into the section of replacement pipe 20 and transfers driving force from the equipment without an intermediate tool, such as tool 40. The collet 60 includes three portions 62A, 62B, 62C that may be positioned adjacent one another to form an annular shape. The resulting opening 63 has an interior diameter Dhmr that is configured to receive a pneumatic hammer, or other equipment to provide a force F, and hold it in place as driving force is applied. Each of the portions 62A, 62B, 62C has a portion 64 that fits in the section of replacement pipe 20 and a shoulder 66 that abuts a front edge of the section of replacement pipe 20. The resulting outside diameter Dinsert of the portion 64 is generally less than the interior diameter Dnew of the section of replacement pipe 20. The portion 64 may have a taper that facilitates insertion of the collet 60 into the section of replacement pipe 20 while also providing greater clamping force to equipment positioned in the opening 63 as force F is applied. The driving force F is transferred from the equipment through the collet 60 to the section of replacement pipe 20.

Figure 11:
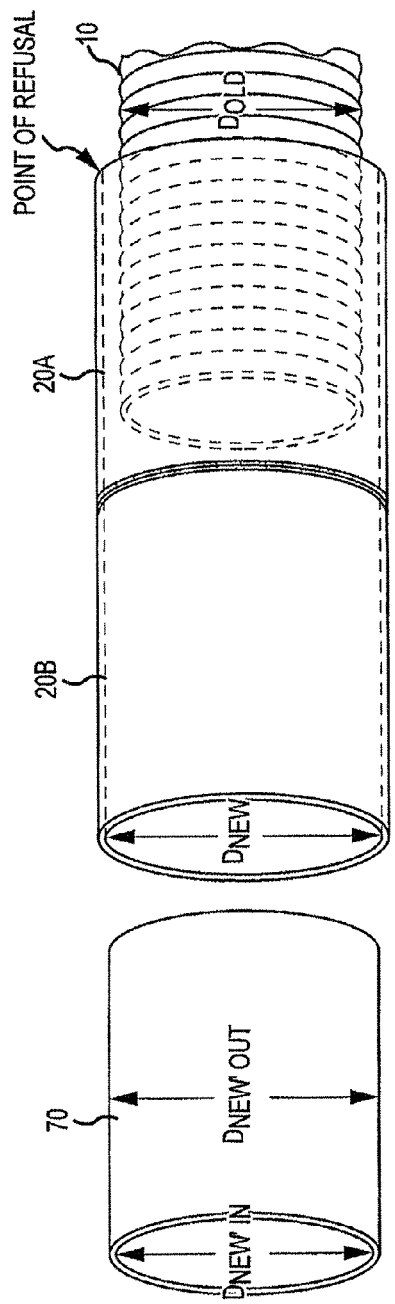
FIGS. 11-13 are diagrams for a trenchless culvert replacement process according to an embodiment of the invention.
Figure 12:
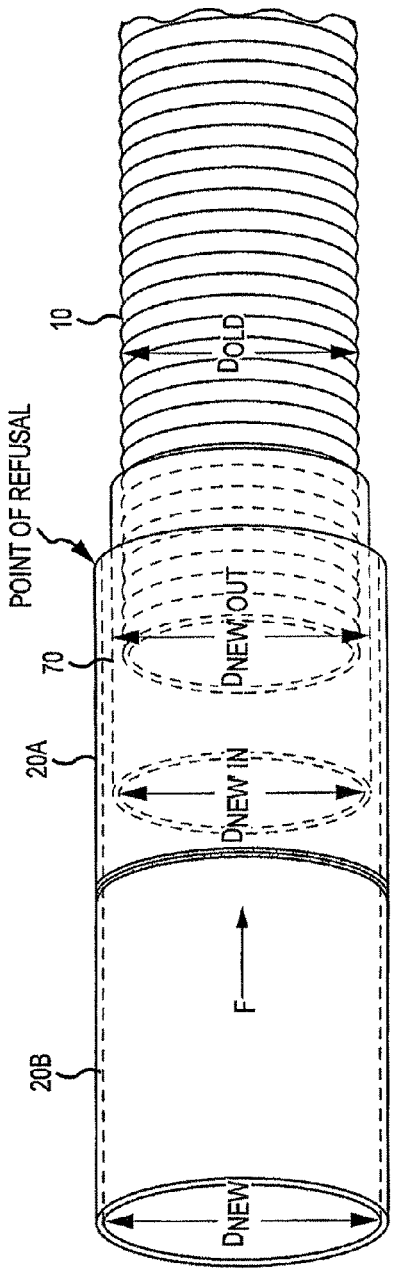
Figure 13:
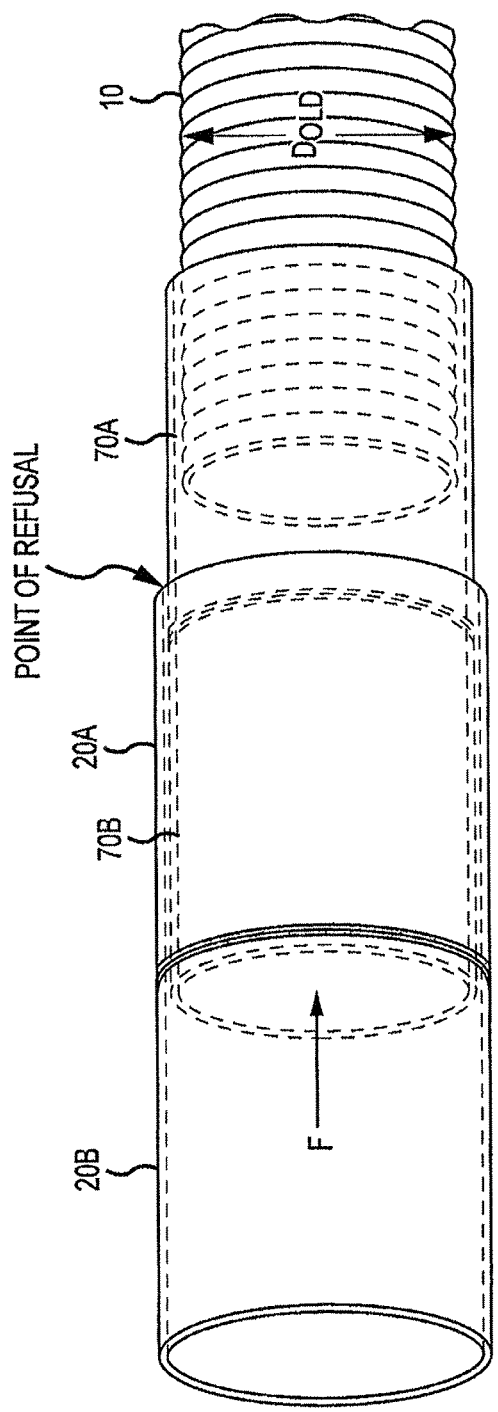

FIGS. 11 through 13 illustrate a trenchless drainage structure replacement process according to an embodiment of the invention. The embodiment illustrated in FIGS. 10 through 13 may be used when a "point of refusal" is reached when driving a first replacement pipe (e.g., 20A and 20B in FIGS. 10 through 13). That is, the first replacement pipe 20 cannot be driven forward any further than the point of refusal. For example, a point of refusal may be encountered when the first replacement pipe 20 encounters an obstruction such as immovable debris or rocks. A second replacement pipe 70 having an exterior diameter Dnew'out that is less than the interior diameter Dnew of the first replacement pipe 20, and having an interior diameter Dnew'in that is greater than the exterior diameter of the culvert 10 can be used to "telescope" past the first replacement pipe 20 and have at least a portion that is positioned around the culvert 10 to swallow the culvert (FIG. 11). A first section of the second replacement pipe 70A is driven by a force F into the material in which the culvert 10 is buried at the same line and grade as the first replacement pipe 20 and the culvert 10 (FIG. 12). After a portion of the culvert 10 is swallowed, a second section of the second replacement pipe 70B is aligned with the first section of the second replacement pipe 70A and positioned adjoining the first section of the second replacement pipe 70A. The first and second sections of the second replacement pipe 70A, 70B are joined, for example, by welding. A force F is applied to the second section of the second replacement pipe 70B to drive it and the first section of the first replacement pipe 70A further forward past the first replacement pipe 20 and over the culvert 10. Portions of the culvert 10 that are swallowed may be cut and removed to facilitate further driving of the later sections of the second replacement pipe 70 (FIG. 13).

The sections of the second replacement pipe 70 may be specifically fabricated having a suitable diameter for the telescoping previously discussed. The sections of the second replacement pipe 70 may also be sections of the first replacement pipe cut and rejoined to provide a smaller diameter pipe than originally fabricated.

From the foregoing it will be appreciated that, although specific embodiments of the invention have been described herein for purposes of illustration, various modifications may be made without deviating from the spirit and scope of the invention. For example, in the embodiments of FIGS. 1-13, the culvert 10 and the replacement pipes have circular cross-sections. However, the culvert 10, or more generally, the drainage structure to be replaced and replacement drainage structures may have other cross-sectional shapes without departing from the scope of the present invention. Accordingly, the invention is not limited except as by the appended claims.

What is claimed is:

1. A method for replacing a drainage structure located in a material, the method comprising:
    attaching a mounting portion of a tool to a first section of a replacement drainage structure, the mounting portion connected to a receiving portion of the tool via spaced supports;
    aligning a first section of a replacement drainage structure according to a line and grade of a drainage structure to be replaced, the replacement drainage structure having an interior cross-sectional dimension greater than an outer cross-sectional dimension of the drainage structure to be replaced;
    attaching a pneumatic hammer to the receiving portion of the tool using a collet, wherein a portion of the collet is inserted into the receiving portion such that a shoulder of the collet abuts the receiving portion;
    driving the first section into the material to be positioned substantially around the drainage structure to be replaced;
    aligning a second section of the replacement drainage structure to the first section;
    joining the second section to the first section;
    driving the second section into the material and thereby drive the first section further into the material; and
    removing a portion of the drainage structure to be replaced.

2. The method of claim 1 wherein removing the portion of the drainage structure to be replaced comprises removing a portion around which at least a portion of the first section is around.

3. The method of claim 1, further comprising applying a lubricant when driving the sections of the replacement drainage structure into the material.

4. The method of claim 1, further comprising joining an attachment to a leading edge of the first section, the attachment configured to urge the leading edge of the first section in a direction.

5. The method of claim 1 wherein joining the second section to the first section comprising welding the second section to the first section.

6. The method of claim 1 wherein removing portions of the drainage structure to be replaced comprises cutting off a portion of the drainage structure to be replaced and removing the portion from within the replacement drainage structure.

7. The method of claim 1, wherein:
    the second section has an interior diameter that is greater than the exterior diameter of the drainage structure to he replaced and an exterior diameter that is less than the interior diameter of the first section, and wherein the driving the second section into the material comprises driving at least a portion of the second section ahead of a leading edge of the first section.

* * * * *